United States Patent [19]

Lovell

[11] Patent Number: 5,040,826

[45] Date of Patent: Aug. 20, 1991

[54] SLIDING SUSPENSION WITH LIFT JACK

[76] Inventor: Patrick A. Lovell, 245 S. Heber St., Beckley, W. Va. 25801

[21] Appl. No.: 509,285

[22] Filed: Apr. 16, 1990

[51] Int. Cl.⁵ ............................................. B60S 9/00
[52] U.S. Cl. ................................. 280/840; 280/6.12; 280/149.2
[58] Field of Search ................. 280/840, 80.1, 149.2, 280/6.12

[56] References Cited

U.S. PATENT DOCUMENTS

4,413,943  11/1983  Liljestrom .................... 280/149.2
4,568,094   2/1986  Lovell .............................. 280/840
4,944,522   7/1990  Hart ................................. 280/80.1

Primary Examiner—Kenneth R. Rice
Attorney, Agent, or Firm—Lorusso & Loud

[57] ABSTRACT

A highway trailer having rear wheels that are longitudinally adjustable along a slide rail also has when parked, a lift capability by use of an on-board jack. The bed floor at the rear of the trailer may be raised to match loading dock levels of varying heights and to allow the addition and removal of rail truck wheels without the need for special equipment at the site. A lift jack is attached to move fore and aft of the trailer along with a concomitant movement of the rear wheels and to bear against a horizontally extended flange portion of the slide rail that underlies the trailer bed floor.

23 Claims, 11 Drawing Sheets

SLIDING SUSPENSION WITH LIFT JACK

This invention relates to towable vehicles such as highway trailers having a rear wheel assembly which is slidable fore and aft of the vehicle and having a rear lift capability to raise the loading end to a loading dock level or to allow insertion of rail truck assembly.

BACKGROUND

The present invention constitutes an improvement over the lift structure disclosed in my prior U.S. Pat. No. 4,568,094 reissued as U.S. Pat. No. Re. 32,736.

A need exists for providing a lift structure that can be used with highway trailers which have the capability of fore and aft trailer wheel adjustment. A difficulty is presented because the lift jack which elevates the trailer bed floor must be attached to move also with the subframe carrying the wheels and not interfere with other operations with the trailer or introduce any problems relating to safety.

Another problem area relates to the adaptation of a highway trailer for transport by rail. The Willetts U.S. Pat. No. 4,385,857 discloses an inter-model rail-highway system for trailer-containers which requires special in-ground facilities at each conversion location.

SUMMARY OF INVENTION

An object of the present invention is to provide a novel vehicle trailer which is towable by a conventional tractor where the rear trailer wheels may be adjustable fore and aft and where one end of the load bed can be raised when the trailer is stopped. This novel construction can lift the rear trailer bed floor to dock height to facilitate loading and unloading of cargo through the rear doors or to allow conversion of the trailer to have also rail truck wheels so that the vehicle may be towable on rails as part of a train. Rail truck wheels can be added or removed without the need for special equipment in the rail yard for this purpose.

Another object of this invention is to provide a novel lift mechanism that is fore and aft slideable along with a subframe which carries the highway engaging wheels so that one end of the vehicle can be raised relative to its lower transport position irrespective of the fore and aft position of the wheels. This construction allows use of a lowered floor with small wheels and provides increased trailer volume without increasing the exterior height or width dimensions of the trailer.

A further object is to provide a lift jack beneath a horizontally extending plate or flange portion of a longitudinally extending slide rail with the lift jack being supported by a subframe that is slidable fore and aft along a portion of the length of the towed vehicle. The lift jack may have a ground engaging shoe or may be attached between upper and lower parts of a two-part subframe which parts are pivotally connected to each other. With either construction, the vehicle load bed can be raised while the vehicle is stopped by extending the jack. Use of the two-part construction allows the vehicle wheels to continue to support the vehicle bed as the jack is extended. Use of the ground engaging pad allows the functional needs to be met satisfactorily in some applications while using a construction which is less complicated and less costly.

A yet further object is to provide a construction where the position of the lift jack is between the tandem wheels on a conventional trailer which has fore and aft wheel adjustment capabilities. The lift jacks on each side of the vehicle are positioned so that the upper end of the jacks transmits a lifting force on the bed frame which may be either by a plate that is outboard of the slide rail or by a horizontally extending outboard flange portion of each slide rail.

Still another object is to provide a novel lift assembly where the subframe is formed of an upper part and a lower part, the two parts being pivotally connected at one end with the jack located between the two parts. The lower part carries a tandem or single axle wheel assembly and spring suspension. The upper part serves as an intermediate member that has an upper surface that is slidable along a horizontally extending plate or flange portion of the slide rail that is secured to the trailer bed. In one embodiment where the lifting jack is between the rear most wheel and the end of the bed floor, the jack upper end may engage a horizontal portion that is inboard of the vertical slide rail portions. In another embodiment the lifting jacks are positioned between the wheels of the tandem axle unit and the jack upper end acts on a horizontal plate or flange portion that is outboard of each vertical slide rail portion.

These and other objects of the invention will become more fully apparent from the claims and from the description as it proceeds in connection with the appended drawings.

DETAILED DESCRIPTION OF PREFERRED EMBODIMENTS

Figure 1:
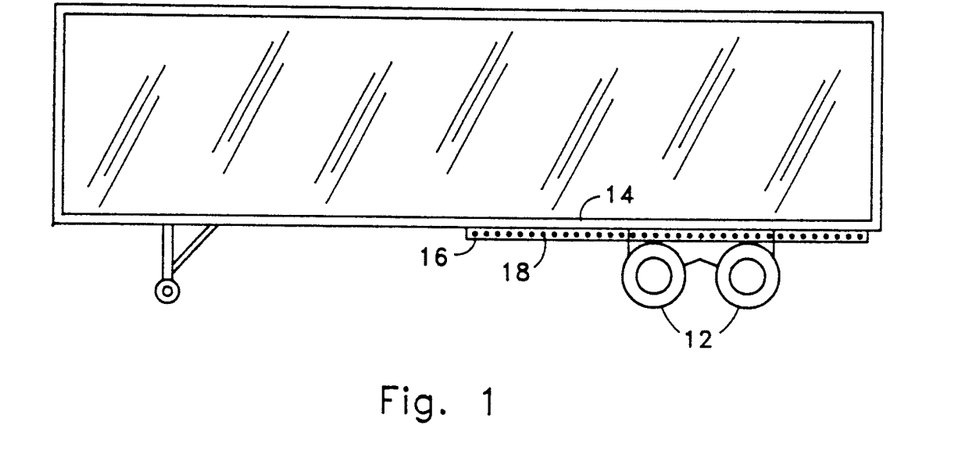
FIG. 1 is a side elevation showing a type of trailer or vehicle which may advantageously utilize the present invention.

Referring to FIG. 1, a vehicle such as a trailer 10 is shown to have a tandem rear axels as part of a bogey with highway or ground engaging wheels 12 that traditionally have pneumatic tires. As wheel and tire sizes for such utility trailers generally have had a uniform diameter, the height between the ground and vehicle bed floor has been about four feet. With use of wheels and tires having smaller diameters, the vehicle bed floor may be lowered by as much as about one foot thereby increasing the volume of the trailer and raising the need for a lift system that is operable during loading and off loading at docks where motor driven vehicles such as a fork-lift truck are commonly used. My prior U.S. Pat. No. 4,568,094 discloses one system that has been useful on trailers where the longitudinal position of the rear trailer wheels is fixed.

Trailers used in interstate travel and in different countries are restricted as to size, axle weight, and distances between the kingpin on a tractor at the front of a trailer and the rear wheels 12. The rear trailer wheels 12 are adjustable fore and aft along the slide rails 16 which are secured with underside of the bed floor 14 and which have a large number of pin receiving holes 18 (FIG. 1), as indicated by the center lines in FIG. 2. In several states where freeway ramps have short radii the kingpin to rear wheel distance is limited to a relatively short amount to protect road shoulders. On the other hand, better distribution of the axle weight can be obtained by moving the rear wheels on the trailer to the rear most position.

In bi-modal transportation systems where the trailer is used also with rail wheels such as shown for example in FIG. 2 of the Willetts U.S. Pat. No. 4,385,857, the disclosure of which is hereby incorporated by reference, there is a need to move the rear trailer wheels toward the kingpin by a distance that is sufficient to allow the rail truck wheel assembly to be installed at the rear of the trailer. To facilitate the installation and removal of rail wheels, it is necessary to position the trailer in alignment with the rail, to raise the rear of the trailer sufficiently to allow the rail wheels to be rolled under the rear of the trailer while the highway engaging wheels are moved to their forward most position under the trailer.

Figure 2:
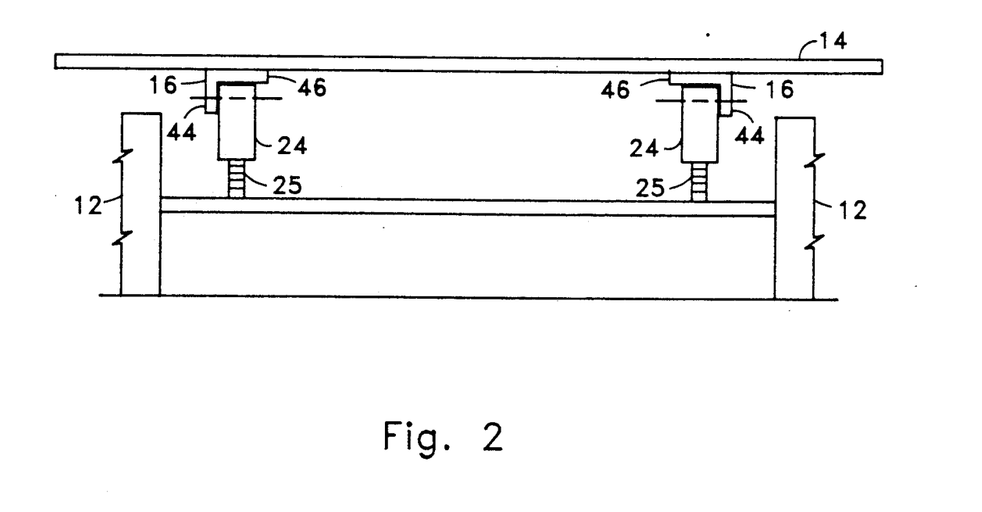
FIG. 2 is a diagrammatic rear view of the rear of the trailer as shown in FIG. 1.
Figure 3:
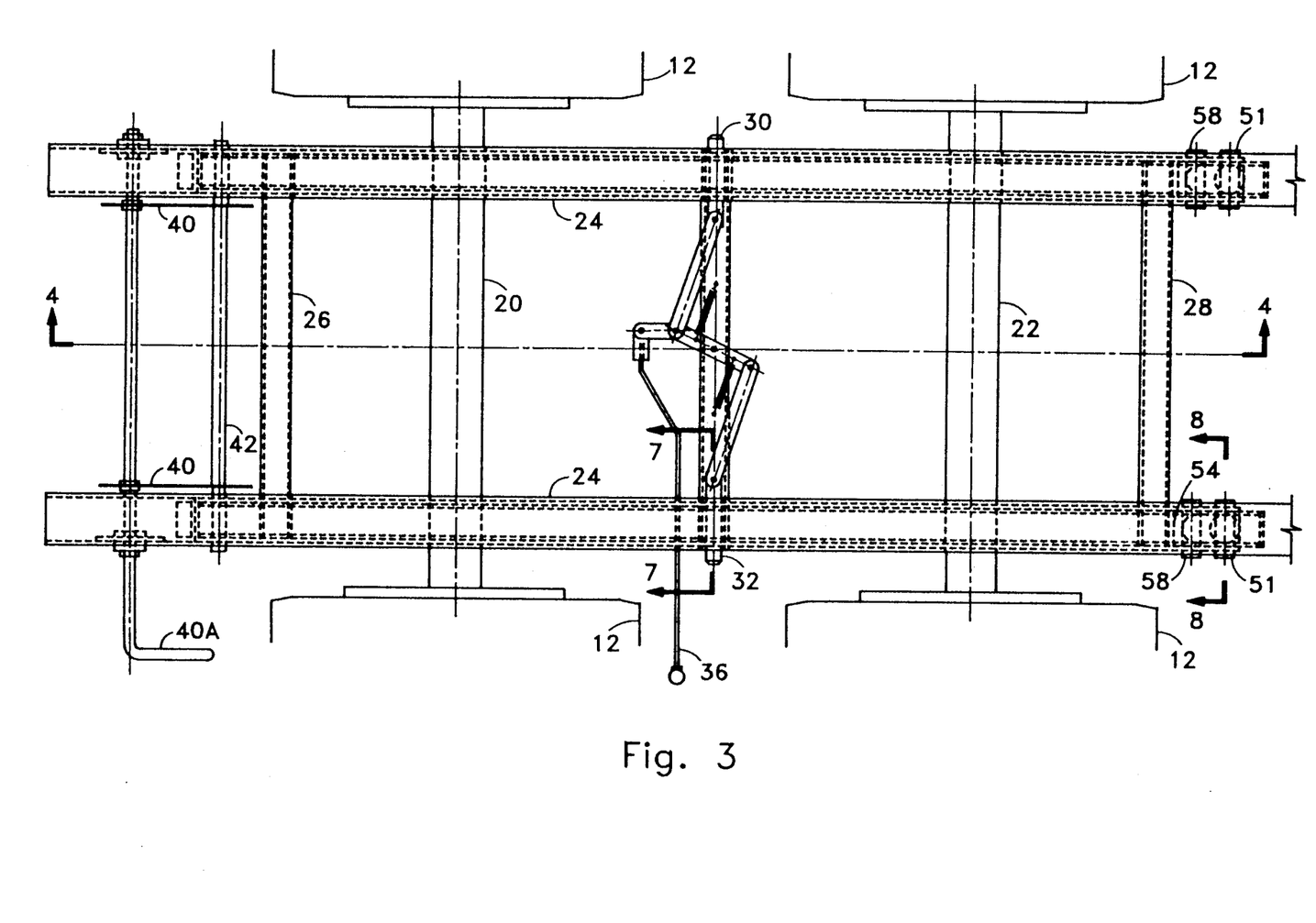
FIG. 3 is a plan view of the subframe which carries tandem axles, a suspension and wheels, all of which are slidable fore and aft of the trailer bed.
Figure 4:
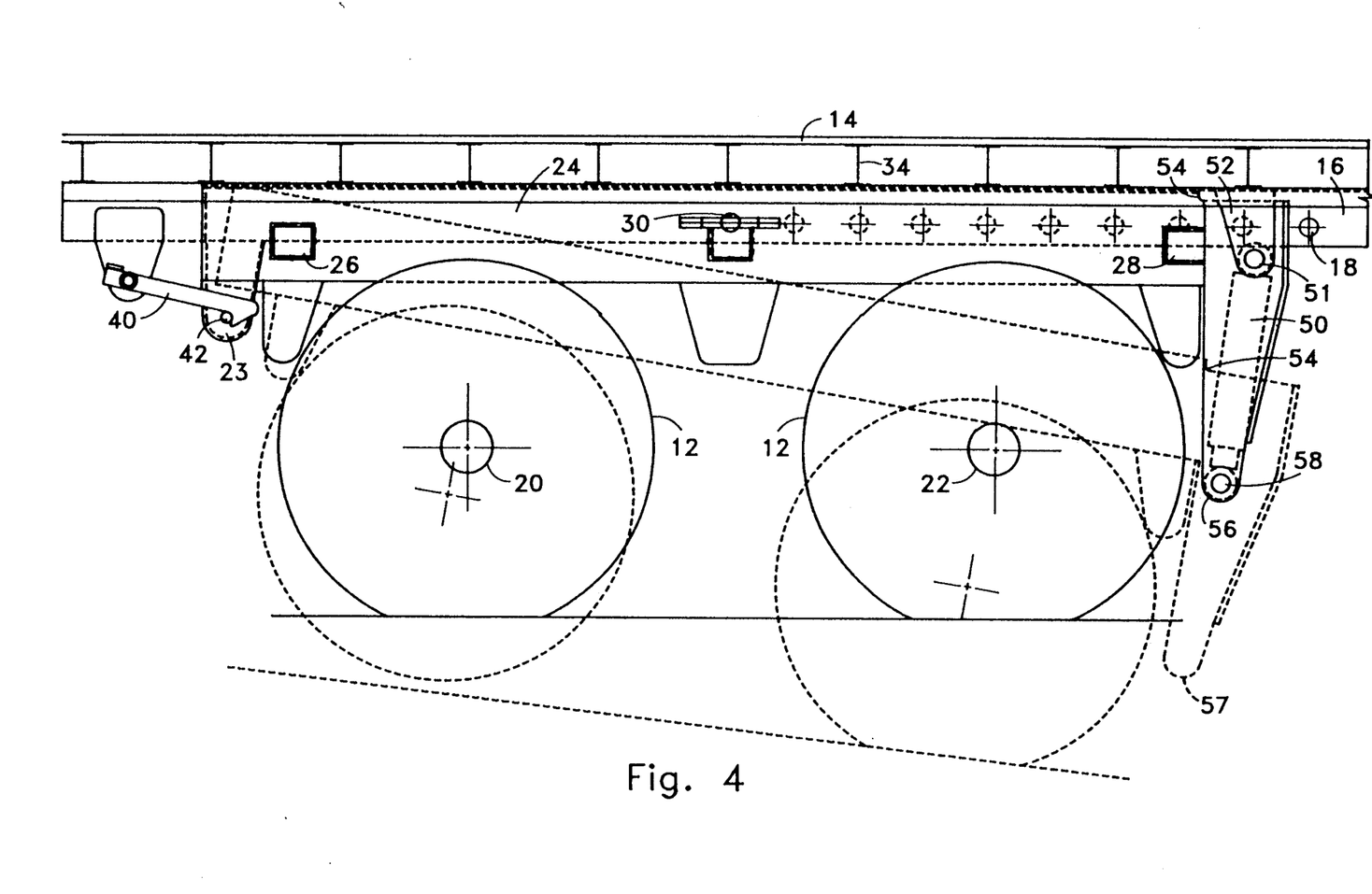
FIG. 4 is a side elevation of the subframe taken along line 4—4 of FIG. 3 and shows also the bed floor, the cross members and the apertured vertical flange of the slide rail and a lift cylinder between the rear bogey wheel and the rear loading end of the trailer.
Figure 5:
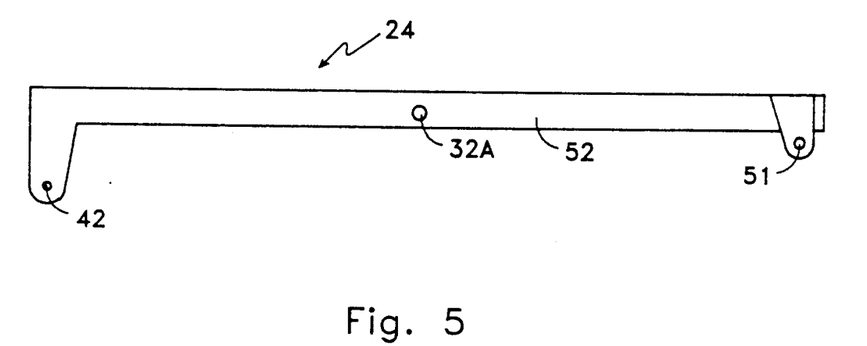
FIG. 5 is a side elevation of an upper member that slides along the length of the trailer floor and carries the upper end of a lift jack cylinder.
Figure 6:
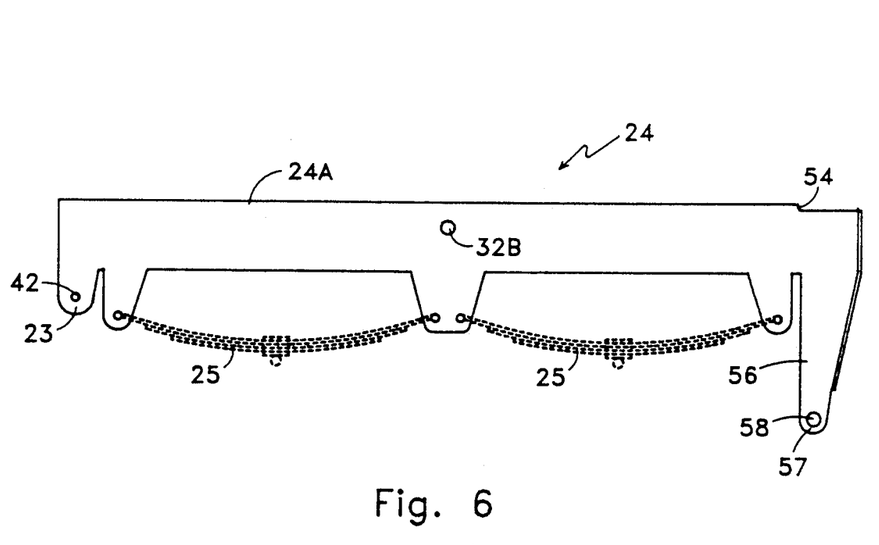
FIG. 6 is a side elevation of a lower member which is pivotally connected at its forward end to the upper member of FIG. 5 and carries upper ends of a spring suspension for the axles of the trailer rear wheels and receives the lower end of the lift jack piston rod.

With reference to FIGS. 2-6, the subframe or suspension load frame according to the present invention may carry a single axle, or tandem axles 20, 22 with wheels 12 and a conventional suspension system such as leaf springs as indicated diagrammatically at 25 on FIGS. 2 and 6 or air bags. The longitudinally extending subframe 24 on each side of its forward and rearward end is connected to cross members 26, 28 as illustrated in FIG. 3 to form a rigid box shaped subframe. Lock pins 30, 32 are shown in FIGS. 3-6 to extend through the longitudinal members 24 of the subframe and to be retracted from and extended through holes 18 of the slide rails 16 that are rigidly secured to cross members 34 which underlie the bed floor 14 of the vehicle as shown on FIG. 4. Structures other than pins and holes may be used for effecting the fore and aft adjustment of the trailer wheels relative to the trailer bed floor. In the illustrated embodiment, a lock pin control handle 36 is provided at one side of the trailer between the wheels 12. One or more lock pin control handles may be provided and they may be located at any convenient position along the subframe member 24 such as rearwardly of the rear wheel.

With reference also to FIGS. 5 and 6, when lock pin 32 is retracted from apertures 32A and 32B, the subframe including members 24, 26, and 28 together with the wheels 12 may be shifted fore and aft along the length of the trailer in a manner well-known to those working in this art. When the subframe is shifted to its forward most position as illustrated in FIGS. 3 and 4, a safety latch 40 at each side of the subframe is shown to be engagable with the pivot pin 42. Pivot pin 42 extends across the width of the trailer between longitudinally extending subframe members 24. When used with rail truck wheels, the subframe should be in its forward most position. The use of the safety latches 40, which are attached to slide rail 16 that is secured to the bed floor 14, on each side of the trailer together with a pivot pin 42 provide an index position when rail wheels are being installed and a back-up protection against an inadvertent omission to lock pins 30, 32 which normally maintain the subframe in a locked position during travel conditions whether on the road or rail. Safety latches 42 can be released by turning handle 40A of FIG. 3.

To lift the rear or loading end of the bed floor 14 when the lock pins 30, 32 (FIG. 3) are retracted thereby to allow vertical lifting of the bed floor 14 relative to the wheels 12, a jack 50 (FIGS. 4 and 8), such as a fluid cylinder which may be supplied with hydraulic fluid or gas such as air, is provided under the bed floor at a position near each of the slide rails 16. The slide rails 16 usually have an apertured vertical flange 44 and a horizontally extending flange portion 46 which extends inboard of the center line of the vehicle. On the underside of horizontally extending flange portion 46 is a layer 48 of a low friction material such as polytetrafluoroethylene (Teflon).

Figure 7:
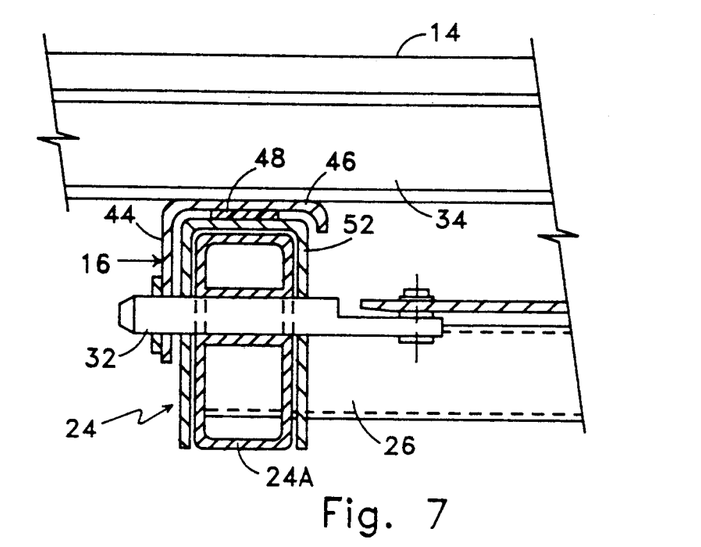
FIG. 7 is a partial end elevation taken along line 7—7 of FIG. 3 which shows the locking pins for maintaining a fixed longitudinal position for the subframe and wheels relative to the bed frame.

The lower member of the two-part subframe has longitudinally extending members 24 that do not directly contact the underside of the horizontal extending flange 46 or the low friction layer 48. Instead the lower member of the two-part subframe is under an upper longitudinally extending member 52 shown in FIGS. 5, 7 and 8 and sometimes referred to herein as an intermediate member. Intermediate member 52 is here illustrated to have a U-shaped cross section at the location of the jack 50 to receive pin 51 at the upper end of cylinder 50. At the forward end of the two-part subframe, longitudinally extending members 24 and 52 each have depending ears that are both apertured to receive the pivot shaft 42. Alternatively, the lift jack 50 may be at the forward end of the subframe and the pivot shaft 42 at the opposite or rear end.

Figure 8:
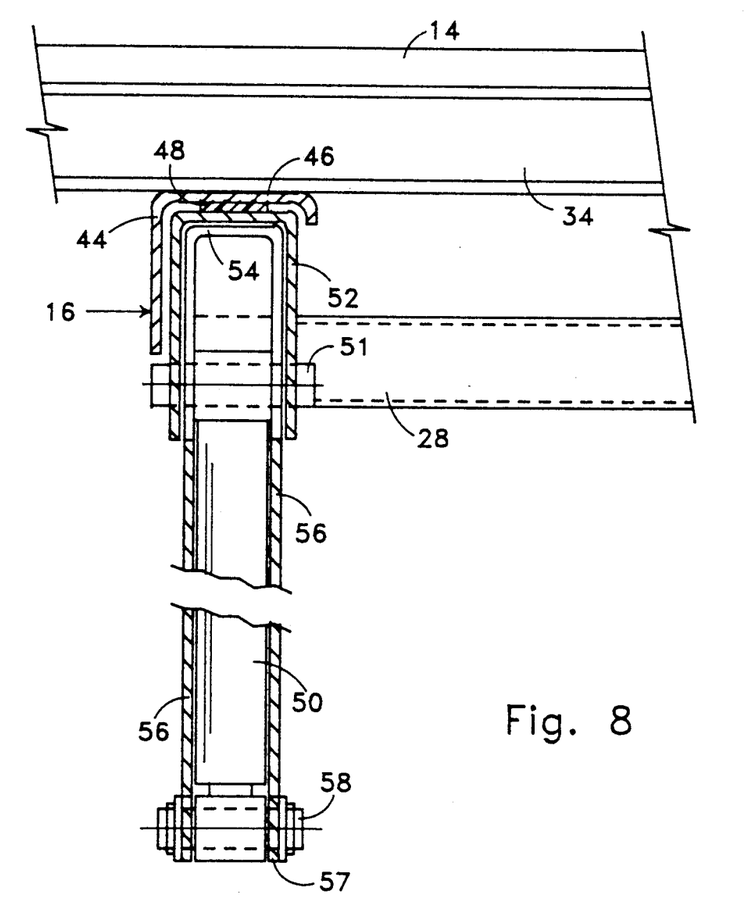
FIG. 8 is a view taken generally along line 8—8 of FIG. 3 showing the lift cylinder connected to the upper part of a two-part subframe and located under a horizontal flange portion of the slide rail that is inboard of the vertical flange and showing its piston connected to the lower part of the two-part subframe.

A lift jack 50, here shown in FIG. 4 as a hydraulic cylinder and piston unit, has its upper end at pin 51 connected to depending ears of intermediate member 52 as illustrated in FIG. 8. The upper surface of the lower longitudinal subframe member 24 which is the lower part of the two-part subframe has an upper surface which terminates at an end edge 54 that is forwardly of the lift jack 50. The side walls 56 on the lower part of the subframe may be elongated to extend downwardly to end 57 (FIG. 4) and receive the lower pin 58 or the piston rod that is associated with the cylinder 50. By locating the upper end of jack 50 and its pin 51 rearwardly beyond the end edge surface 54 of the lower member (FIG. 6) of the subframe, the jack 50 can extend downwardly to an appropriate connection pivot 58. When the hydraulic pressure is applied to cylinder 50, the lifting force on upper pin 51 causes the rearward end of intermediate member 52 to abut against the antifriction member 48 and horizontally extending flange portion 46 of the slide rail 16 that underlies the bed floor 14. The lower pin 58 that is shown in FIG. 8 to be connected to opposed walls 56 that are part of the lower subframe member and which extend rearwardly beyond end edge surface 54, provides a force which tends to separate the intermediate member 52 and lower member 24 at their ends opposite pivot pin 42 to a position that is shown in dotted lines in FIG. 4. In FIG. 4, the ground is shown to be angled and the bed remaining level simply for ease of illustration; in actuality, the ground remains fixed and the bed floor is raised at the right end which is intended to designate the rear of the trailer as viewed in FIG. 4. Suitable controls are conventionally available and may be used to adjust the height at the rearward end of the trailer 10.

From the foregoing description, it should be understood that both lift jack pins 51 and 58 move fore and aft along with the subframe which carries wheels 12. In this embodiment, the subframe consists of an upper or intermediate part 52 (FIG. 5) and a lower part (FIG. 6) that are connected for pivotal movement about pin 42. The upper part is the longitudinally extending member 52 which extends rearwardly from pin 42 to receive the pivot pin 51 at the upper end of the jack for cylinder 50. The upper part 52 is here illustrated to have a U-shaped cross section aft of surface 54 that straddles the upper end of lower part extension 56 to thus be liftable from the lower part when the vehicle is stopped and the lift jack actuated.

On occasions when the rear of the trailer is supported on rail wheels for rail transit, double acting jacks 50 may be used to raise the highway wheels 12 above the track surface and the wheels 12 can be mechanically locked in their highest position by lock pins 30, 32 or by auxiliary pins and other apertures as desired so that the hydraulic load on the jacks 50 is released during transport, whether by road or by rail. The fore and aft position may be maintained by safety latches 40 which automatically engage the pivot pin 42 when the subframe is caused to move to its forward most position as illustrated in FIG. 4.

SECOND EMBODIMENT

Referring to the embodiment illustrated by FIGS. 9-12 a first difference is that the lift cylinders 100 are located between the axels of wheels 102, 104. The bed floor 12 is supported on the cross members 14 which in turn are supported by slide rails 16 which each have a vertical extending flange 44 as in the embodiment of FIGS. 1-8 with apertures 18.

The subframe 24 includes also the intermediate member or upper portion 52 (FIG. 11) and a lower portion 24A (FIG. 12) which carries the axels of wheels 102, 104. The intermediate member 52 and the lower member 24A are connected for pivotal movement about pin 42 which is at a forward end of the subframe 24 and which is longitudinally slidable relative to the slide rails 16.

Figure 10:
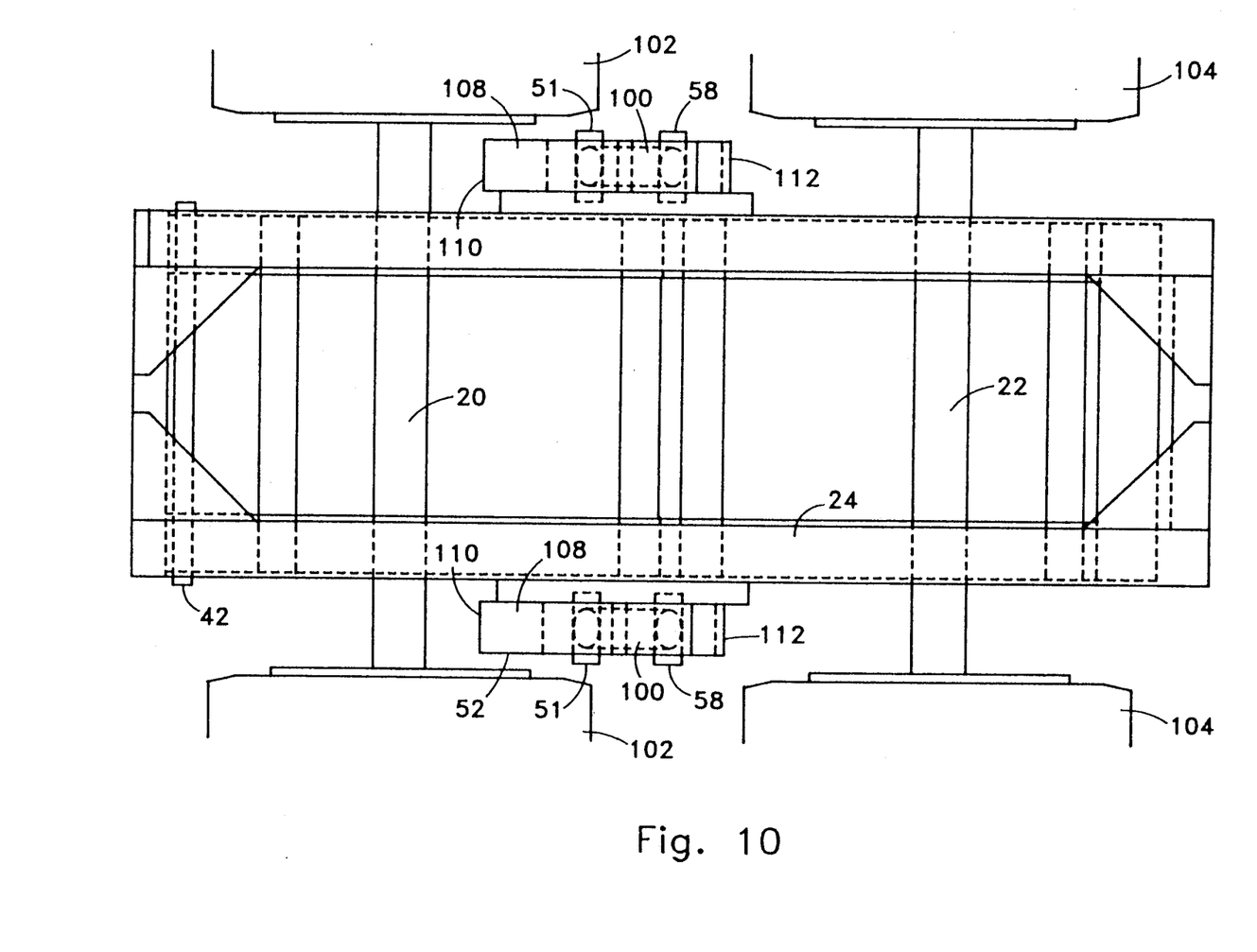
FIG. 10 is a top plan view of the second embodiment of FIG. 9 showing the lift cylinder connected to the upper part of a two-part subframe and located under a horizontal flange portion of the slide rail that is outboard of the vertical flange and showing its piston connected to the lower part of the two-part subframe.
Figure 11:
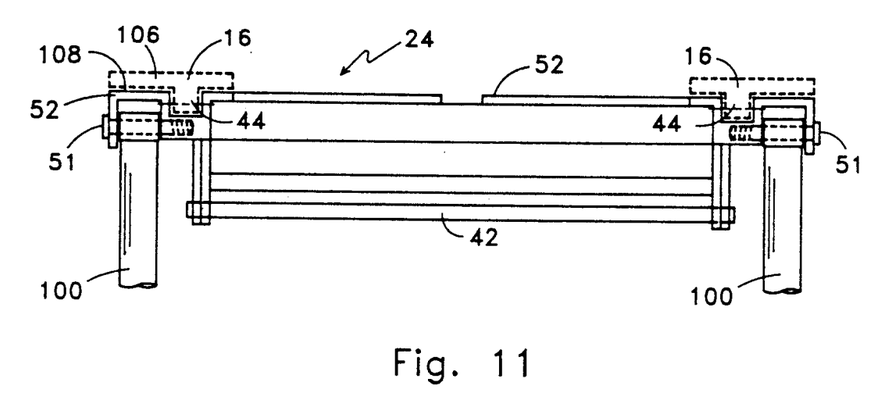
FIG. 11 is a rear end view of the upper part of the two-part subframe for the second embodiment.

The lift jack which is here illustrated in FIG. 11 to be a hydraulic cylinder 100, has an upper pin 51 that serves to connect the cylinder 100 to an inverted U-shaped portion 62 that is part of the intermediate member 52. The inverted U-shaped portion 62 is outboard of the vertical portion 44 of the slide rail 16. The inverted U-shaped portion 62 has an upper surface 108 (FIGS. 9-11) which is beneath the bed floor 14 and engages a lower surface of a flat plate area 106 which is outboard of the vertical flange portion 44. The flat plate area 106 may be a horizontally extending portion of the slide rail 16 as illustrated by dashed lines in FIG. 11 or the horizontally extending portion 106 may be a separate plate.

Figure 9:
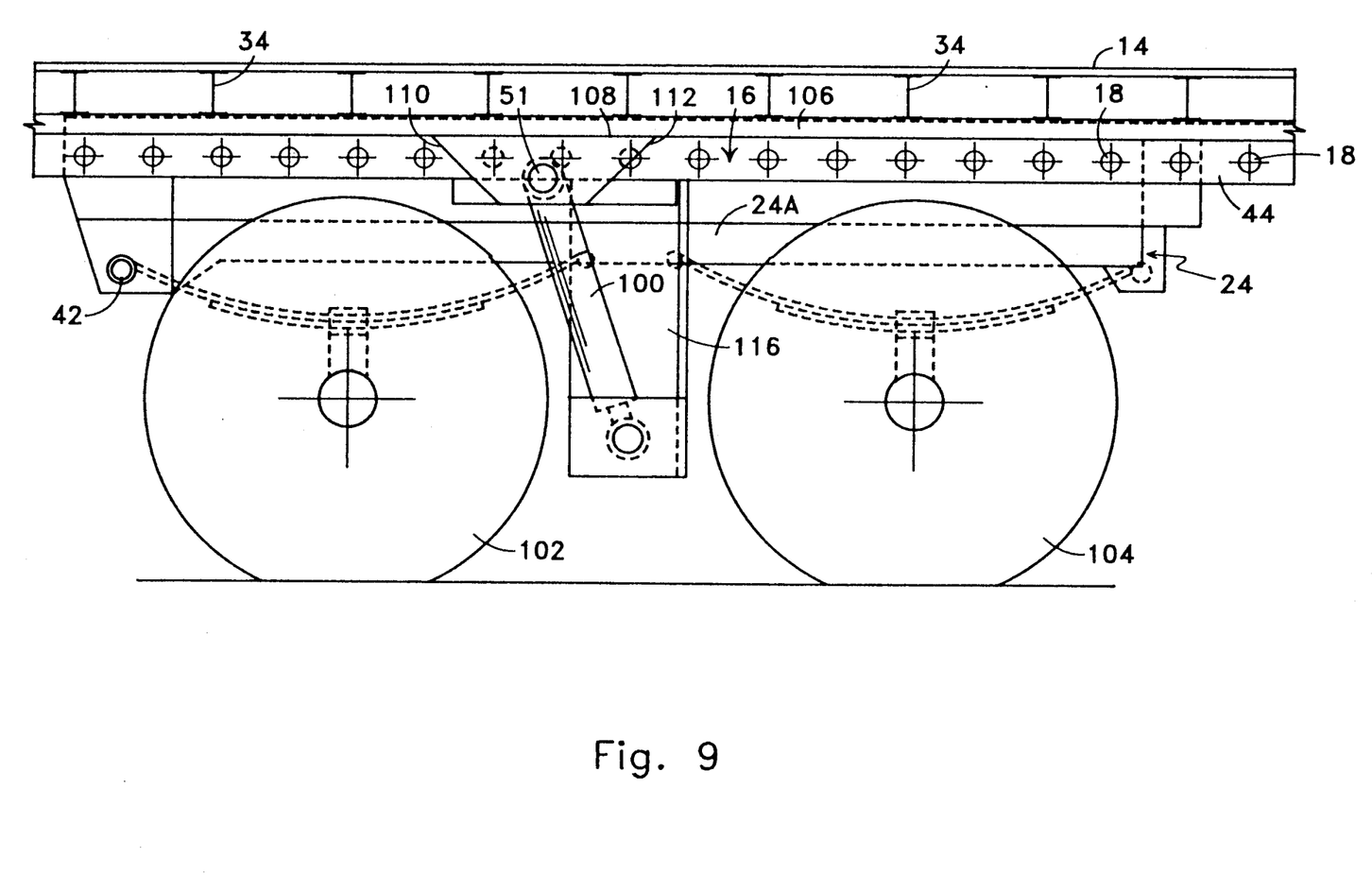
FIG. 9 is a side view similar to FIG. 4 of a second embodiment wherein the lift jack cylinder is located between the tandem axles of the vehicle bogey.

The upper surface 108 of the inverted U-shaped portion 62 as shown in FIG. 11 is relatively short in a longitudinal direction and may extend between front edge 110 and rear edge 112 as shown in FIGS. 9 and 10. For structural integrity, the length of upper surface 108 is preferably about twice the distance between adjacent cross members 14. Ears on opposite sides of the upper surface 108 receive pin 51 which supports the upper end of cylinder 100 outboard of the vertical portion 44 of the slide rail 16.

Figure 12:
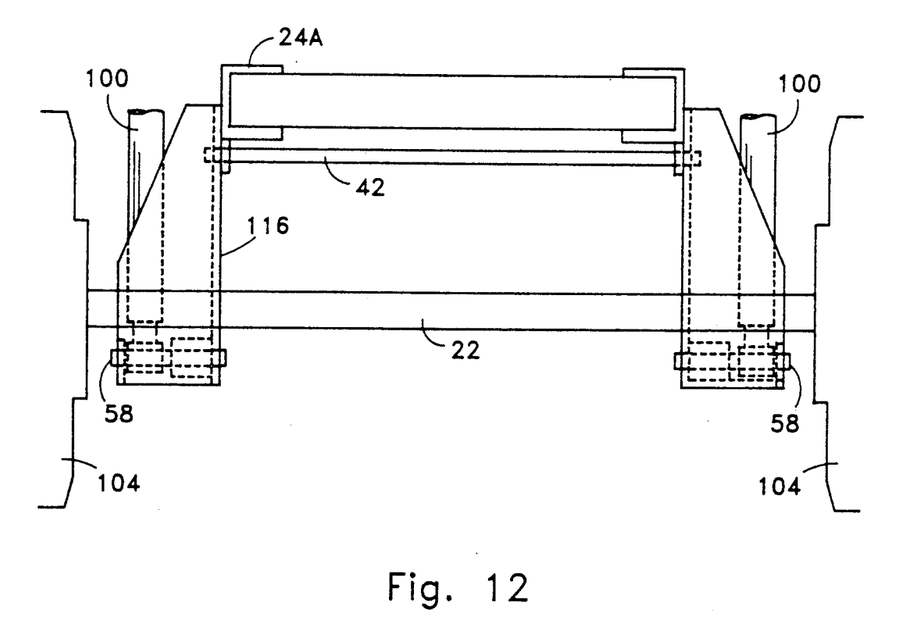
FIG. 12 is a rear end view of the lower part of the two-part subframe for the second embodiment.

Referring now also to FIG. 12, the wheels 104 are shown at opposite ends of axel 22. The axle may be suspended by springs similar to those described in connection with FIG. 6. As part of the suspension, a downwardly extending bracket including a plate 116 and accompanying structure to provide sufficient strength, receives pivot pin 58 which extends through the end of the piston of the cylinder 100 so that when hydraulic fluid is supplied under pressure to the upper end of the cylinder, the force tends to separate the ground engaging wheels 102, 104 and the bed floor 14. This causes bed floor 14 at the rear or loading end of the trailer to be raised when the forward end of the trailer is supported at a fixed level as by a king pin support plate on a towing vehicle or by front support posts that are customarily provided on trailer types here involved.

The axial direction of the cylinder 100 is preferably tilted in the forward direction as illustrated in FIG. 9 so that when the piston is extended, the axis of the cylinder reaches a nearly vertical orientation. Because the cylinder 100 is positioned closer to the pivot pin 42 in the embodiment of FIG. 9 than in the embodiment of FIG. 4, the stroke length of the piston can be made shorter. Also, by having the cylinder 100 between the wheels 102, 104 in the FIG. 9 embodiment, there is a reduced likelihood of damage to the lift jack mechanism and increased space for rail wheels.

THIRD EMBODIMENT

Figure 13:
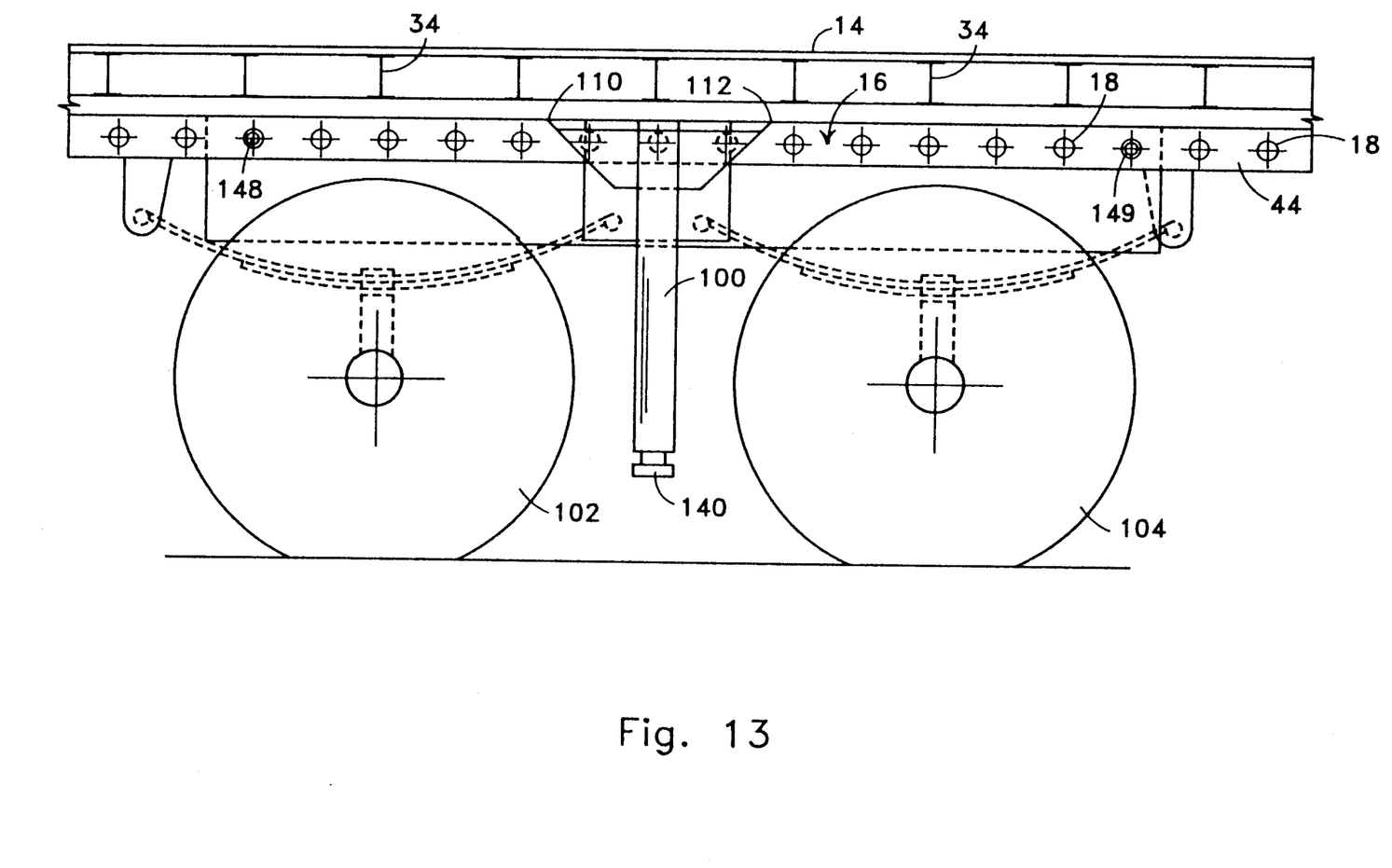
FIG. 13 is a side view similar to FIGS. 4 and 9 of a third embodiment wherein the lift jack cylinder is located again between the tandem axels of the vehicle bogey but the lower jack end has a ground engaging pad.
Figure 14:
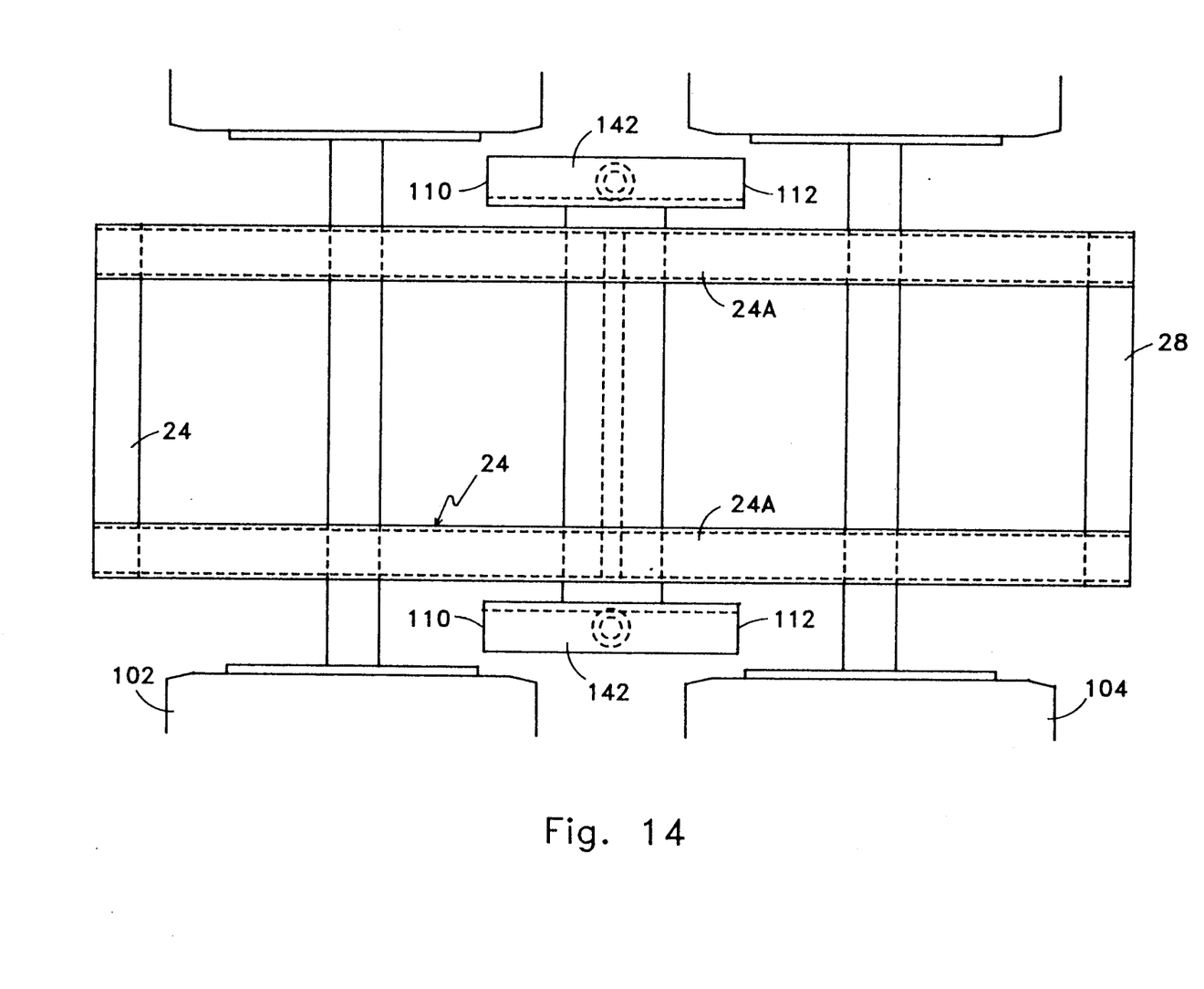
FIG. 14 is a top plan view of the slidable subframe of the third embodiment of FIG. 13 showing the lift cylinder located at a position to be under a plate or portion of the slide rail that is outboard of the vertical flange.
Figure 15:
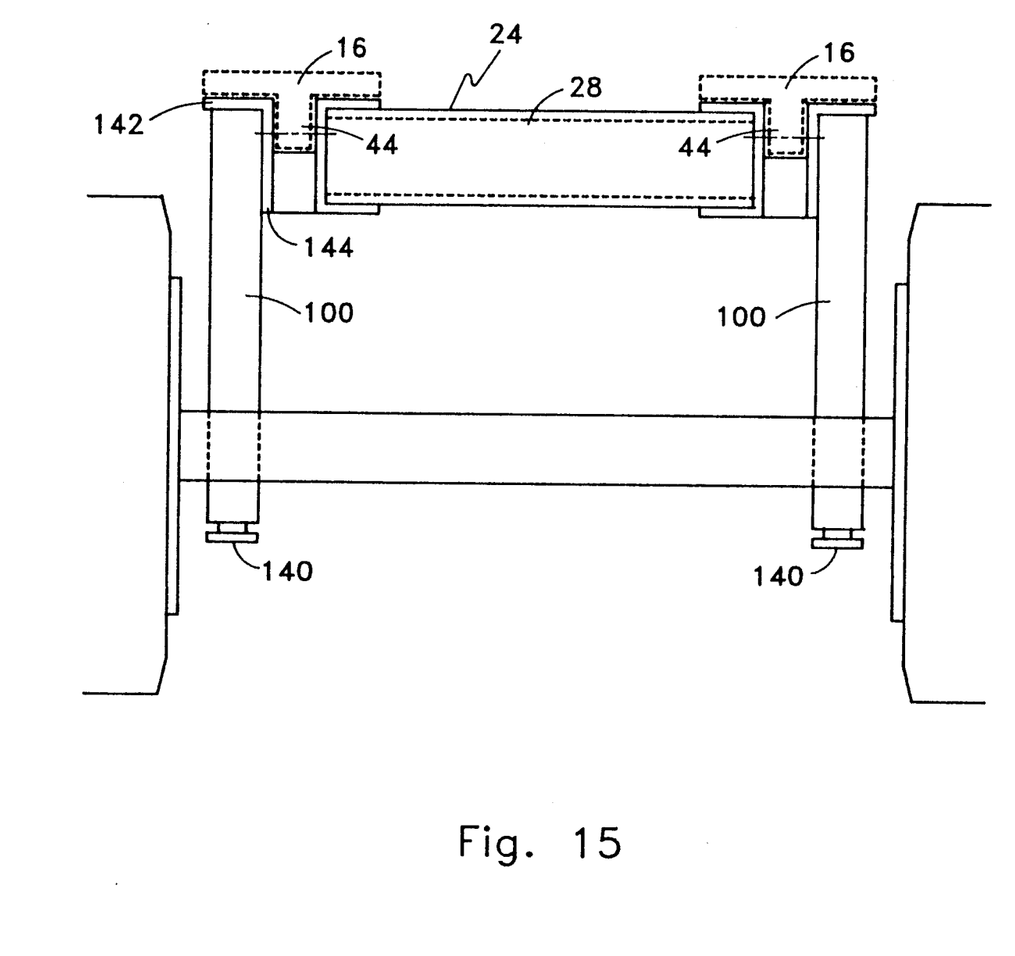
FIG. 15 is a front end view of the lower part of the subframe for the third embodiment with a slide rail having a T-shaped cross-section.

Referring now to the third embodiment illustrated by FIGS. 13-15, one unique feature is that the lower end of the piston associated with the hydraulic cylinder 100 is a ground engaging pad 140. The upper end of cylinder 100 may be secured two the underside of footer 142 which has a downwardly extending portion 144 that is attached to or otherwise made part of subframe 24. Footer 142 has end surfaces 110 and 112 as illustrated in FIG. 14. Footer 142 is positioned outboard of the vertical flange portion of slide rails 16. Transverse members 26 and 28 extend between longitudinal members 24A to form a rigid subframe 24.

The subframe 24 carries the suspension including the axles and wheels allowing fore and aft longitudinal movement along slide rails 16 as in the other embodiments. In this embodiment, two pins 148, 149 on each side of the trailer are provided to lock the subframe 24 at selected longitudinal positions along slide rails 18.

In the embodiment of FIGS. 13–15, there is no intermediate frame needed because the lift cylinder may be secured directly to the slideable subframe members 24A. The ground engaging pads 140 can serve to lift the entire trailer bed floor while raising the wheels off the ground.

While wheel engagement with the ground is helpful for preventing the trailer from shifting its position while the load bed is raised, which can occur when the ground is not firm as sometimes encountered due to broken pavement, over-heated asphalt, thawing conditions during cold weather and the like, the cost-benefit of this embodiment may be preferred for some applications where the ground support surface is firm.

During transport operations, both forward pins 148 and rearward pins 149 are inserted. Where railway wheels are installed under the rear of the trailer, the highway wheels are mechanically locked in a longitudinal position by pins 148, 149 and also in a vertical position so as not to interfere with rail travel without relying upon fluid pressure.

While several embodiments of the present invention have been described, other changes and modifications will become apparent to those working in this art. It is intended that all changes that fall within the scope of the claims and any equivalents thereof be covered hereby.

I claim:

1. A towable vehicle comprising:
   a bed floor having a first end and a second end;
   a subframe having ground engaging wheels on opposite sides of and supporting said bed floor;
   means for providing fore and aft adjustment movement of the subframe and wheels relative to the bed floor including a pair of longitudinally disposed slide rails that are fixed to the bed floor, each of said slide rails having a associated therewith a horizontally extending flange or plate having a surface extending under the bed floor and a vertical flange configured to provide a plurality of lockable positions for said to subframe; and
   means for raising the bed floor at one of said ends relative to an underlying wheel support surface including jack means carried by said slidable subframe and having an upper end located to provide a lifting force to an underside of each of said slide rail horizontal flanges or plates at a position determined by the location of the subframe in the fore and aft direction.

2. The vehicle as defined in claim 1 wherein the jack means is positioned between said one bed floor end and the wheel nearest said one end.

3. The vehicle as defined in claim 2 wherein the horizontally extending flange or plate extends inboard of the vertical flange and the jack means is positioned in a substantially vertical plane beneath said horizontal flange.

4. The vehicle as defined in claim 1 wherein one of said wheels is positioned between one bed frame end and said jack means.

5. The vehicle as defined in claim 4 wherein the horizontally extending flange or plate extends outboard of the vertical flange and the jack means is positioned in a substantially vertical plane beneath said horizontal flange or plate.

6. The vehicle as defined in claim 1 wherein the jack means includes a fluid cylinder and piston unit with an upper end of the cylinder attached to said subframe.

7. The vehicle as defined in claim 6 wherein the upper end of the cylinder is attached to depending ears that are part of said slideable subframe and the subframe has a surface that faces an underside of said flange or plate and a low friction member is positioned between said last-mentioned surface and said flange or plate underside.

8. The vehicle as defined in claim 7 where the last mentioned surface has a length that is sufficient to bridge over two cross members.

9. The vehicle as defined in claim 7 wherein the lower end of said cylinder and piston unit has a ground engaging pad.

10. The vehicle as defined in claim 1 wherein the subframe comprises an upper part which slideably engages said slide rail and a lower part which carries axles for said wheels, said upper and lower parts are joined by a pivot connection having a pivot axis that extends laterally of said bed floor; and
    wherein the lower end of a cylinder and piston unit is attached to said subframe lower part whereby the subframe upper part is raised relative to said lower part when the piston is extended from said cylinder by pivotal movement between said upper and lower parts about said pivot axis.

11. The vehicle as defined in claim 10 wherein the upper end of the cylinder is attached to the subframe upper part, said upper part being beneath a surface that faces an underside of said flange or plate and a low friction member is positioned between said last-mentioned surface and said flange or plate underside.

12. The vehicle as defined in claim 11 wherein the last-mentioned surface has a length that is sufficient to bridge across two cross members.

13. A towable vehicle having:
    ground engaging wheels;
    cross supports transverse to the longitudinal vehicle direction;
    longitudinal rails under the cross supports at opposite sides of a center line of the vehicle;
    a lower frame mounted for longitudinal displacement along the longitudinal rails so that the longitudinal distance between one end of the trailer and rotational axis of the wheels is capable of being adjusted;
    said lower frame including a suspension for said ground engaging wheels;
    an intermediate frame member that is positioned between an upper surface of the lower frame and a lower surface adjacent each of the longitudinal rails;
    said intermediate frame member being mounted for pivotal movement about a pivot axis relative to said lower frame and longitudinally slidable along the lower surface of said longitudinal rails with a longitudinal displacement of said lower frame; and jack means having an upper end attached to said intermediate frame member and a lower end attached to said lower frame so that upon an expansion of the jack means, an end of the intermediate frame member remote from said pivot axis is raised above the lower frame to thereby raise one end of the vehicle.

14. The vehicle as defined in claim 13 wherein the longitudinal rails include a vertical flange having a configuration to locate said lower frame and said intermediate frame member at any one of a plurality of positions along the length of the vehicle;
    the intermediate frame member and the lower frame member are both positioned beneath the vertical flange; and
    the jack means are positioned on opposite sides of the trailer centerline to be under a lower surface of each of said longitudinal rails.

15. The vehicle as defined in claim 14 wherein the jack means on each side is located between said one vehicle end and the wheel nearest thereto.

16. The vehicle as defined in claim 13 wherein the longitudinal rails each have a central vertical flange and a horizontal flange portion extending outboard thereof;
    said vertical flange having a configuration to locate said lower frame and said intermediate frame member at any one of a plurality of positions along the length of the vehicle;
    the intermediate frame member and the lower frame member are both positioned to extend under said horizontal flange portion; and
    the jack means are positioned outboard of the vertical flange to be under respective ones of said outboard horizontal flange portions.

17. The vehicle as defined in claim 16 wherein the jack means on each side is located forwardly of one of the ground engaging wheels on each side of said trailer.

18. A towable vehicle comprising:
    a bed floor having a first end and a second end;
    a subframe including ground engaging wheels on opposite sides of and supporting said bed floor;
    means for providing fore and aft adjustment movement of the subframe and wheels relative to the bed floor including a pair of longitudinally disposed slide rails that are fixed to the bed floor;
    each of said slide rails having an angle or T-shaped cross section including a vertical flange that is configured to provide a plurality of locked positions for said subframe and at least one horizontal flange portion;
    said subframe being positioned under the horizontal flange portions of said slide rails; and
    means for raising the bed floor at one of said ends relative to the underlying wheel support surface including jack means carried by said slidable subframe and having an upper end located to provide a lifting force to an underside of the horizontal flange portion.

19. The vehicle as defined in claim 18 wherein the slide rails have a T-shaped cross section with inboard and outboard horizontally extending flange portions and the jack means is positioned under an outboard horizontal flange portion of each of said slide rails.

20. The vehicle as defined in claim 18 wherein the jack means has a lower end which has a ground engaging pad and an upper end which has a layer of low friction material which slideably engages an undersurface of its associated horizontal flange portion of a slide rail.

21. The vehicle as defined in claim 18 wherein a subframe comprises a lower frame member and an intermediate frame that are connected for relative pivotal movement;
    said lower frame member carries said ground engaging wheels and a suspension therefore;
    said intermediate frame carries a cylinder that is part of said jack means; and
    said lower frame member further includes a portion which extends below said intermediate frame member that is attached to a piston carried by said cylinder.

22. A towable vehicle comprising:
    a bed floor having a forward end and a rear loading end;
    a subframe having highway engaging wheels on opposite sides of and supporting said bed floor;
    means for providing fore and aft adjustment movement of the subframe and wheels relative to the bed floor which provides a plurality of lockable longitudinal positions for said subframe which when in a locked condition prevents also vertical separation between the bed floor and subframe;
    means for raising the bed floor at one of said ends relative to the underlying wheel support surface including jack means carried by said slidable subframe and having an upper end located that is effective to lift said bed floor only when the subframe and bed floor are in an unlocked condition; and
    safety locking means engageable only when the subframe is at a predetermined position near a mid-position end of the bed floor for maintaining said subframe and bed floor in a predetermined longitudinal positional relationship while raising the bed floor.

23. The trailer as defined in claim 22 wherein the trailer is adaptable also for transport using rail wheels that are installable near the rear loading end when the safety locking means is engaged.

* * * * *